United States Patent
Xu et al.

(10) Patent No.: US 8,632,685 B2
(45) Date of Patent: Jan. 21, 2014

(54) MULTISTAGE DAF-ADVANCED OXIDATION SYSTEM

(71) Applicant: WSI International LLC, Centennial, CO (US)

(72) Inventors: Yuanchun Xu, Highlands Ranch, CO (US); Alfred Tyler, Annapolis, MD (US); William Fields, Centennial, CO (US)

(73) Assignee: WSI International LLC, Centennial, CO (US)

( * ) Notice: Subject to any disclaimer, the term of this patent is extended or adjusted under 35 U.S.C. 154(b) by 0 days.

(21) Appl. No.: 13/673,208

(22) Filed: Nov. 9, 2012

(65) Prior Publication Data

US 2013/0118988 A1  May 16, 2013

Related U.S. Application Data

(60) Provisional application No. 61/557,965, filed on Nov. 10, 2011.

(51) Int. Cl.
| | |
|---|---|
| C02F 1/24 | (2006.01) |
| C02F 1/56 | (2006.01) |
| C02F 1/28 | (2006.01) |
| C02F 9/02 | (2006.01) |
| C02F 1/72 | (2006.01) |
| C02F 9/12 | (2006.01) |

(52) U.S. Cl.
USPC .......... 210/703; 210/705; 210/706; 210/202; 210/205; 210/206; 210/221.2

(58) Field of Classification Search
USPC ................. 210/703, 705, 706, 202, 205, 206, 210/221.2
See application file for complete search history.

(56) References Cited

U.S. PATENT DOCUMENTS

| | | | |
|---|---|---|---|
| 5,728,303 A | 3/1998 | Johnson | |
| 6,117,333 A * | 9/2000 | Frankiewicz et al. | 210/705 |
| 2002/0020631 A1 | 2/2002 | Gavrel et al. | |
| 2004/0060876 A1 | 4/2004 | Tipton | |
| 2008/0237141 A1 | 10/2008 | Kerfoot | |

FOREIGN PATENT DOCUMENTS

| | | |
|---|---|---|
| EP | 0469582 | 2/1992 |
| WO | 2005/113446 | 12/2005 |
| WO | 2006/116533 | 11/2006 |

OTHER PUBLICATIONS

International Search Report and Written Opinion of the International Searching Authority dated Jan. 24, 2013 from the European Patent Office in International Application No. PCT/US2012/064313.

* cited by examiner

*Primary Examiner* — Thomas M Lithgow
(74) *Attorney, Agent, or Firm* — Young & Thompson

(57) ABSTRACT

A multistage dissolved air flotation and advanced oxidation (MDAF-AO) system/method with multi-functions in oil recovery, solids removal, emulsion breaking, and advanced oxidation. Influent, with oil and suspended solids, enters a first stage for oil recovery includes a gas ionizer and an air dissolving pump. A second stage includes of two coagulation/flotation compartments connected in serial to enhance solids removal efficiencies. Micro air bubbles are created by air dissolving pumps in each compartment. A third stage is for the emulsion breaking unit to further remove or recover the emulsified oils. A fourth stage includes advanced oxidation by using ultraviolet (UV) and hydrogen peroxide to oxidize and disinfect the bacteria and microorganisms.

10 Claims, 3 Drawing Sheets

MULTISTAGE DAF-ADVANCED OXIDATION SYSTEM

BACKGROUND OF THE INVENTION

In oil and gas fracturing operations, produced water contributes a significant amount of wastewater. According to American Petroleum Institute (API) statistics, for each barrel (bbl) of oil produced, an average of 7.5-10 bbl of water will be produced. The produced water contains dispersed oil and grease, produced solids, organic and inorganic chemicals, salts, bacteria, metals, and sulfate, etc. The contaminants exist in produced water in a variety of physical states including solution, suspension, emulsion, adsorbed particles, and particulates. The most common method for produced water disposal includes separating the oils and suspended solids by flotation and gravity settling and injecting the treated water into deep-wells, as permitted.

Dissolved air flotation (DAF) is a process whereby micro-air-bubbles attach themselves to suspended materials causing them to float to the surface of a flotation chamber to achieve liquid/solids separation. DAF systems are frequently used to provide wastewater pretreatment, product recovery, and capture and thicken biological solids in industries ranging from food processing to pulp and paper as well as to oil and gas, and petrochemical industries.

The modern DAF technology utilizes the air dissolving pump to generate the micro bubbles required to float the solid particles in wastewater. Flow enters the influent chamber with air saturated water provided by the air dissolving pump. Air is introduced into the pump suction and the bubbles are sheared into much smaller bubbles by the pump and then dissolved into the water by high pressure. A polymer, or other coagulants, will be added into the influent mixing and coagulation chamber to enhance the removals of solids or oil.

The water then enters the flotation chamber by passing over the influent chamber dividing wall. The velocity of the water in the flotation chamber is significantly reduced to maximize separation potential. Inside the flotation chamber, the microbubbles (saturated water mixture), which have attached themselves to the particle's surface, change the particle's density. This causes the previously suspended solids to float to the surface where paddle assemblies skim them from the surface into a sludge trough.

Heavy grit and solid particles settle onto the bottom of the DAF where they are flushed out into the sludge system via a manual valve. The clarified liquid then enters the effluent chamber and passes over an effluent weir into an effluent box.

However, the conventional DAF technology itself can only remove some of the contaminants in the produced water, such as oil and grease, suspended solids, as well as a certain amount of the organics. A multifunction treatment system is eagerly demanded by the oil and gas industry in order to fulfill the produced water discharge limits and to protect the injection well and/or to extend injection well life time.

The present invention described below addresses the foregoing problems, combining the technologies of oil recovery, solids removal, emulsion breaking, and advanced oxidation together and gives the oil and gas industry a compact, mobile, simple operation, and multifunction solution. In addition to the oil and gas industries, this invention can also be applied in food processing, pharmaceutical, agricultural, as well as municipal wastewater pre-treatments.

SUMMARY OF THE INVENTION

In one embodiment, the invention comprises a Multistage DAF Advanced Oxidation unit (MSDAF-AO) having four distinct sections:

Stage I Enhanced oil recovery
Stage II Enhance solids removal
Stage III Emulsion breaking stage/hydrogen peroxide treatment
Stage IV Disinfection using advanced oxidation (AO)

These stages are described in detail as follows:

1. Enhanced Oil Recovery—Stage I:

Two technologies are incorporated into the oil recovery stage: lamella plates and gas ionizer. The lamella configured PVC plates provide sufficient surface area in the smaller horizontal footprint for oil separation.

A gas ionizer is installed above an air dissolving pump. The ionizing lamp in the gas ionizer operates at with a wavelength suitable for ionizing incoming atmospheric air, a wavelength at or about 40-400 nm having been found to be effective for accomplishing this effect. The ionized air is dissolved into a recirculating system at a suction pipe of an air dissolving pump. When entering the oil recovery chamber at atmospheric pressure, the released ionized gases, coming out of solution, form very fine bubbles. The ionization of the atmospheric gases increases the attractions between air bubbles and oil droplets so as to enhance the oil recovery in Stage I.

The gas ionizer comprises of anode and cathode and adds static charges on the surface of gas particles. The applied voltage and amperage will vary with the maximum of 50 V AC. Further, the voltage and amperage of the gas ionizer is adjusted so that the surface charge density in the oil-water mixture is altered to accelerate the separation of oil and water.

Using the ionized gases as well as the PVC lamella plates enhances the oil removal. As a result, the oil floats to the surface and is collected in an oil collection chamber. The heavy solids settle and are removed from the bottom of a sludge hopper. The lighter suspended solids flow into the next stage for enhanced solids removal.

2. Enhanced Solids Removal—Stage II:

With the oil recovered in Stage I, the water passes under a flow guide plate, and enters Stage II for enhanced solids removal.

In stage II, polymers/coagulates added to maximize the removal of the solids. The air dissolving pump recirculates the DAF effluent and injects the micro size air bubbles into the mixing/coagulation zone. The fine solid particles attach onto the micro air bubbles and float to the surface of the flotation chamber with the fine bubbles. The solids floated in Stage II, are then removed via a solids removal paddle mounted on top of the DAF unit.

The velocity of the water in the flotation chamber is significantly reduced to maximize the solids separations efficiency. The lamella plates are installed in the flotation chamber to provide surface area in the smaller horizontal footprint for solids settling.

Heavy grit and solid particles that have settled onto the lamella plates slide onto the bottom of the DAF where they are flushed out into the sludge system through a knife gate valve. The clarified liquid then enters the effluent chamber.

Two compartments of dissolved air flotation are configured in a row for maximizing the solids removal.

3. Emulsion Breaking Stage—Stage III:

The effluent from the enhanced solids removal stage enters the effluent chamber via the emulsion breaking unit. In the oil industry, fracturing fluids and produced fluids are transported via centrifugal pumps prior to entering the treatment system. This causes a portion of the oil to become emulsified. Through field trials, it has been determined that these emulsions can be broken through the addition of low dosages of hydrogen peroxide. After the emulsion has been broken, the freed oil is recovered from the top of the third stage DAF cell.

The emulsion breaking unit is equipped with plastic media to provide more contact surface area with which to enhance reactions between the emulsion liquid and hydrogen peroxide, as well as other emulsion disrupting compounds.

This stage also acts as a coalescing filter to intercept small flocs which passed through the previous stage flotation chamber and will improve the treated effluent quality.

This stage has its own independent oil recovery system. The recovered oil is re-blended with the oil recovered from the Stage I process.

4. Disinfection/Advanced Oxidation—Stage IV:

The final clarified water from Stage III moves into Stage IV: The Disinfection Chamber.

The disinfection chamber comprises a tank with baffles allowing for serpentine flow. The medium intensity UV lamps are installed in the disinfection chamber. Water from this chamber is recirculated back to the beginning of the serpentine configuration by means of a DAF pump. This DAF pump is used for two purposes: recirculation, and injection of hydrogen peroxide for final disinfection. As the hydrogen peroxide concentration builds in the system and passes through the final UV chamber, advanced oxidation takes place. In the presence of a UV field, peroxide breaks down into hydroxyl radicals. These radicals have high oxidizing potential and are the primary driver of the disinfection process.

In another embodiment, the invention comprises a method for recovering oil, removing solids and other contaminants from contaminated water, as well as disinfecting the treated effluent.

In a first, Enhanced Oil Recovery stage, contaminated water is pumped into an oil recovery chamber, the oil recovery enhanced by lamella plates as well as by ionized gas injection and a recirculation system. A supply of atmospheric gas is ionized, and a voltage is applied between an anode rod and a cathode rod on the gas ionizer. Ionized atmospheric gas is injected into the contaminated water with an air dissolving pump.

The ionized atmospheric gas form micro bubbles in the contaminated water upon release, thereby to cause oil more easily attached on the surface of air bubble and to be floated to a surface of the contaminated water, and heavy solids to settle to a bottom of the oil recovery chamber. The voltage applied between the anode rod and the cathode rod control the surface charge density of the ionized air bubbles so as to facilitate oil attaching onto the surface of the air bubbles. The air dissolving pump recirculation ratio and ionized gas flow rate are regulated so as to float most of oil, not solid particles, in the oil recovery chamber. Heavy solids from the bottom of the oil recovery chamber and the oil that floated to the surface are both removed. The remaining effluent is caused to exit the oil recovery chamber to a coagulation zone in the second stage.

In a second, Enhanced Solid Removal stage, an air dissolving pump released micro air bubbles by recirculating a part of the effluent. Polymers are added to coagulate the small and light solid particles in the first stage effluent to form large flocs. The micro air bubbles attach to the flocs and float the flocs to the surface of a flotation zone. Floated light solids are removed via a removal paddle mounted at a top of the flotation zone. Grit and large solid particles that have settled on lamella plates and collected at a bottom of the flotation zone are flushed.

In a third, Emulsion Breaking in a stage, the effluent is caused to exit the floatation zone to enter an effluent chamber via an emulsion breaking box. Hydrogen peroxide is added to the effluent chamber, and plastic media is packed into an emulsion breaking box to provide more contact surface and enhance the reactions between the hydrogen peroxide and the emulsion liquid. Demulsified oil rising to the surface of the effluent chamber is recovered via an oil collection chamber at a top of the effluent chamber. Clarified water is then caused to exit the effluent chamber.

In a Disinfection/Advanced Oxidation in a stage, the clarified water from the effluent chamber is flowed, in a serpentine manner, through a disinfection chamber that equipped with UV lamps. Water exiting the disinfection chamber is recirculated back through the disinfection chamber via a DAF pump.

At the DAF pump, hydrogen peroxide is injected so that the recirculated water, containing the hydrogen peroxide, is exposed to the energy from the UV lamps so that the peroxide will break down into high oxidizing hydroxyl radicals.

According to particular embodiments, the method described above has one or more of the following characteristics:

the second stage is repeated before the effluent proceeds to the third stage;

the gas ionizing lamp operates at 185 nm; and the emulsion breaking box is equipped with plastic media to provide contact surface area for enhancing reactions between emulsion liquids of the effluent and the hydrogen peroxide.

In another embodiment, the invention is a dissolved-air flotation oxidation unit for removing oil and other contaminants from contaminated water, comprising four stages.

A first stage includes an oil recovery chamber with a lamella plate packing, an ionizing lamp configured to ionize a supply of atmospheric gas, an air dissolving pump for recirculating the first stage effluent via injecting the ionized gas as micro bubbles into the oil recovery chamber, a voltage source for applying a potential to the anode plate and the cathode plate on the gas ionizer, and devices configured to remove oil floating at a surface of the flotation zone and to remove heavy solid settled at a bottom of the oil recovery chamber.

A second stage includes a DAF unit with an air dissolving pump configured to recirculate effluent exiting the second stage. The second stage also includes a mixing/coagulation zone for mixing the polymer with the first stage effluent and the micro air bubbles, a solids removal paddle mounted at a top of the flotation zone for removing the floating solids, and lamella plates configured to catch and guide sediment to a sludge collection chamber at the bottom of the flotation zone.

A third stage includes an effluent chamber, an injector for adding hydrogen peroxide to the effluent entering the effluent chamber, and an emulsion breaking box to receive the fluid entering into the effluent chamber. The emulsion breaking box includes plastic media with surface area configured to enhance reactions between emulsion liquid and the hydrogen peroxide.

A fourth stage includes a disinfecting chamber with a box configured to flow clarified water in a serpentine manner, a DAF pump configured to inject hydrogen peroxide into the water entering the disinfection chamber and to recirculate the said water back to the disinfecting chamber, and UV lamps configured to direct energy to the water flowing through the disinfecting chamber for breaking the peroxide in said water into more oxidizing hydroxyl radicals.

According to particular embodiments, the dissolved-air flotation oxidation unit described above has one or more of the following characteristics:

the dissolved-air flotation oxidation unit also includes serial dissolved air flotation units in the second stage to enhance the solid removal efficiencies; and the gas ionizing lamp operates at 185 nm.

The invention will be better understood upon reading the following description, which is given solely by way of example and with reference to the drawings, as follows.

DETAIL DESCRIPTION OF THE INVENTION

Figure 1:
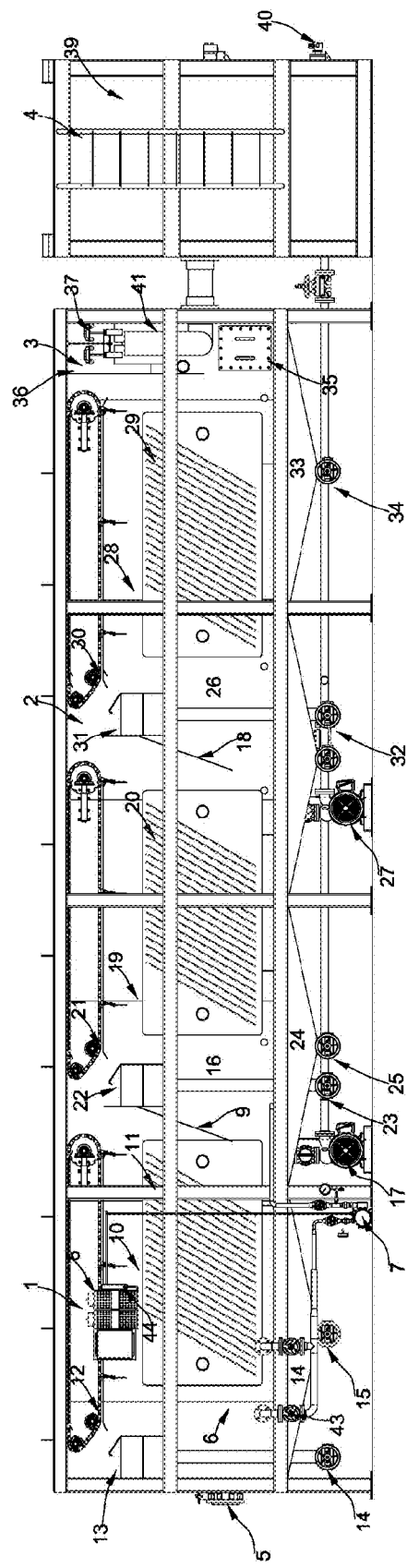
FIG. 1 is the front view of a MSDAF-AO system.
Figure 2:
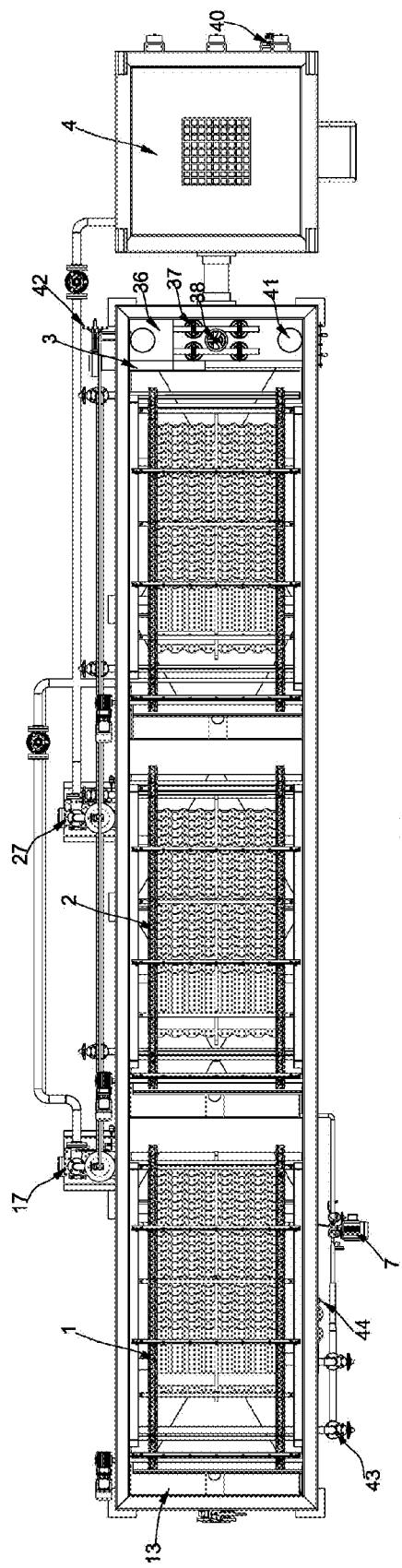
FIG. 2 is the top view of a MSDAF-AO system.
Figure 3:
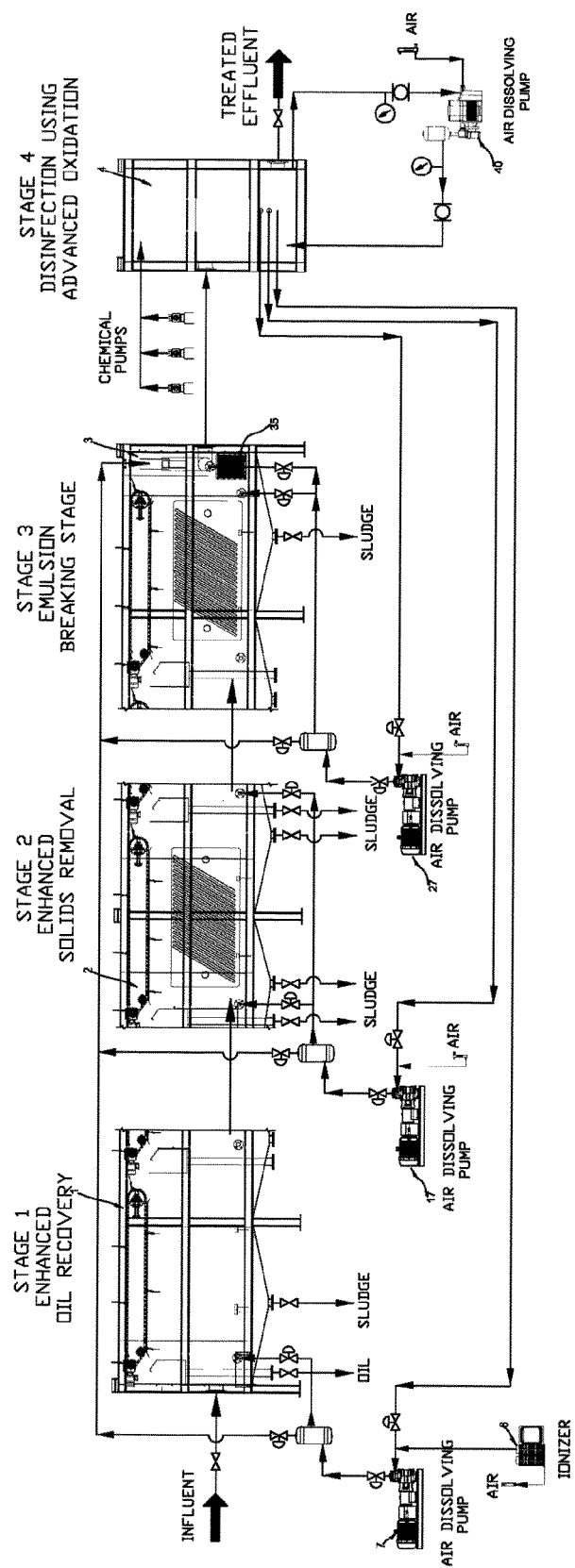
FIG. 3 is the process flow diagram of a MSDAF-AO system.

FIGS. 1-3 illustrate an embodiment of the MSDAF-AO system of the invention. Principle units of MSDAF-AO system include enhanced oil recovery stage 1, enhanced solids removal stage 2, emulsion breaking stage 3, and advanced oxidation stage 4.

The raw wastewater enters the enhanced oil recovery stage 1 through the inlet valve 5. At the mixing zone 6, the influent is mixed with the recirculated water. The air dissolving pump 7 recirculates partial of MSDAF-AO system effluent. The gas ionizer 8 adds static charges on the surface of air particles. The ionized air is introduced into the gas suction port on the air dissolving pump 7 and is dissolved into the recirculated water by the pump pressure. When the recirculated water is released in the mixing zone 6 at the atmosphere pressure, the dissolved ionized air generates micro size bubbles. The micro size bubbles attract and attach on the surface of the oil droplets and float the oils upwards. The water/oil/solid mixtures enter into the flotation zone 10. The lamella plates packing 11 is installed in the flotation zone 10 to create more surface area for oil separation. The oil droplets are floated to and accumulated on the top of flotation zone 10. The oil collection paddle assembly 12 scrapes the oil to the oil collection hopper 13. The recovered oil is discharged through the oil discharge valve 14. The water flows through the lamella plates packing 11 and gets into the mixing/coagulation zone 16 in enhanced solids removal stage 2. The heavier solids settled in the flotation zone 10 are collected at the sludge hopper 14 and discharged through the sludge valve 15.

The recirculation flow rate of the air dissolving pump 7 and the ionized gas flow rate are determined during the system design in such a way to maximize the oil recovery and to minimize the floated solids in order to maintain the recovered oil quality. The pump recirculation flow rate is adjusted by the valve 43. The air flow rate is adjusted by the knob 44 on the air flow meter.

The enhanced solids removal stage 2 comprises two DAF compartments arranged in series. The flow from stage 1 enters the first mixing/coagulation zone 16 in stage 2. The air dissolving pump 17 recirculates a portion of the MSDAF-AO system effluent. Air is introduced into the gas suction port on the air dissolving pump 17 and is dissolved into the recirculated water by the pump pressure. When the recirculated water is released in the first mixing/coagulation zone 16 at atmospheric pressure, the micro-sized bubbles are generated and then attach on the surface of the solid particles and float the solids upwards. The water/solid mixtures enter into the first flotation zone 19. The lamella plates packing 20 is installed in the first flotation zone 19 to provide more surface area for solid separation. The light solids are floated to and accumulated at the top of the first flotation zone 19. The sludge removal paddle assembly 21 scrapes the solids to the sludge hopper 22. The removed sludge from the top of floatation zone 19 is discharged through the sludge discharge valve 23. The water flows through the lamella plates packing 20 and into the second mixing/coagulation zone 26 of the enhanced solids removal stage 2. The heavier solids settled in the flotation zone 19 are collected at the sludge hopper 24 and discharged through the sludge valve 25.

The effluent from the first DAF compartment in stage 2 enters the second mixing/coagulation zone 26. The air dissolving pump 27 recirculates a portion of the MSDAF-AO system effluent. Air is introduced into the gas suction port on the air dissolving pump 27 and is dissolved into the recirculated water by the pump pressure. When the recirculated water is released in the second mixing/coagulation zone 26 at atmospheric pressure, the micro-sized bubbles are generated and then attach on the surface of the solid particles and float the solids upwards. The water/solid mixtures enter into the second flotation zone 28. The lamella plates packing 29 is installed in the second flotation zone 28 to provide more surface area for solid separation. The light solids are floated to and accumulated at the top of the second flotation zone 28. The sludge removal paddle assembly 30 scrapes the solids to the sludge hopper 31. The removed sludge from the top of the second floatation zone 28 is discharged through the sludge discharge valve 32. The water flows through the lamella plates packing 29 and into the emulsion breaking stage 3. The heavier solids settled in the second flotation zone 28 are collected at the sludge hopper 33 and discharged through the sludge valve 34.

The emulsion breaking stage 3 comprises emulsion breaking box 35, effluent chamber 36, and oil recovery pipe 38. The hydrogen peroxide is added underneath the emulsion breaking box 35 to break the emulsified oils. The emulsion breaking box 35 is filled up with the plastic chips to provide contact surface area to enhance the reaction between emulsified oil and hydrogen peroxide. The water enters the MSDAF effluent chamber 36 through the emulsion breaking box 35. The adjustable effluent pipe assembly 37 controls the water level in MSDAF. The demulsified oil is collected by the demulsified oil recovery pipe 38 and discharged through valve 42. The effluent from MSDAF goes through pipe 41 and enters the advanced oxidation stage 4.

The advanced oxidation stage 4 consists of a tank with baffles allowing for serpentine flow and the medium intensity UV lamps 39. The air dissolving pump 40 recirculates the advanced oxidation effluent back to the beginning of the serpentine configuration. Hydrogen peroxide is injected at the suction line of air dissolving pump 40. The hydrogen peroxide breaks into hydroxyl radicals in the presence of a UV field to enhance disinfection of bacteria.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The invention claimed is:

1. A method for removing oil and other contaminants from contaminated water, comprising the steps of:
   in a first stage:
   pumping contaminated water into an oil recovery chamber, said oil recovery chamber comprising an anode plate and a cathode plate, ionizing a supply of atmospheric gas with an ionizing lamp, and injecting the ionized atmospheric gas into the contaminated water, the ionized atmospheric gas forming bubbles in the contaminated water upon release, and applying a voltage between the anode plate and the cathode plate to control a surface charge density in the contaminated water, thereby to cause oil in the contaminated water to float to a surface of the contaminated water, and heavy solids to settle to a bottom of the oil recovery chamber;

in a second stage:

removing the heavy solids and the oil that floated to the surface, and causing a remaining effluent to exit the oil recovery chamber to a coagulation zone, at the coagulation zone, adding coagulates to the effluent and injecting micro air bubbles to float light solids from the effluent to a surface of the effluent, and removing the light solids via a removal paddle mounted at a top of the coagulation zone, and flushing grit and solid particles that have settled on lamella plates at a bottom of the coagulation zone;

in a third stage:

causing the effluent to exit the coagulation zone of the second stage to enter an effluent chamber via an emulsion breaking box, adding hydrogen peroxide to the effluent entering the effluent chamber, and recovering emulsified oil rising to the surface of the effluent via a float at a top of the effluent chamber;

causing clarified water to exit the effluent chamber; and in a fourth stage:

flowing the clarified water in a serpentine manner through a disinfection chamber comprising UV lamps, recirculating water exiting the disinfection chamber back through the disinfection chamber via a DAF pump, at said DAF pump, injecting hydrogen peroxide, so that the recirculated water containing the hydrogen peroxide is exposed to energy from the UV lamps so that peroxide will break down into hydroxyl radicals.

2. The method according to claim 1, wherein the second stage is repeated before the effluent proceeds to the third stage.

3. The method according to claim 1, wherein the ionizing lamp operates at a wavelength suitable for ionizing the supply of atmospheric gas.

4. The method according to claim 3, wherein the ionizing lamp operates at 40-400 nm.

5. The method according to claim 1, wherein the emulsion breaking box is equipped with plastic media to provide contact surface area for enhancing reactions between emulsion liquids of the effluent and the hydrogen peroxide.

6. A dissolved-air flotation oxidation unit for removing oil and other contaminants from contaminated water, comprising:

a first stage, comprising:

an oil recovery chamber including an anode plate and a cathode plate, an ionizing lamp configured to ionize a supply of atmospheric gas, a recirculation pump for pumping the contaminated water via a discharge pipe into the oil recovery chamber, a venturi injector located at the discharge pipe configured to inject the ionized atmospheric gas into the contaminated water at atmospheric pressure so that said atmospheric gas enters the contaminated water as fine bubbles, a voltage source for applying a potential to the anode plate and the cathode plate, devices configured to remove oil floating at a surface of the contaminated water and to remove heavy solid settled at a bottom of the oil recovery chamber;

a second stage, comprising:

a DAF unit, including an air dissolving pump configured to recirculate effluent exiting the first stage, an air-injection apparatus for injecting bubbles into the effluent, a solids removal paddle mounted at a top of the DAF unit for removing solids floating on a top surface of the effluent, and lamella plates configured to catch and guide sediment to a bottom of the DAF unit;

a third stage, comprising:

an effluent chamber, an injector for adding hydrogen peroxide to the effluent entering the effluent chamber, an emulsion breaking box in fluid communication with the effluent chamber, the emulsion breaking box comprising plastic media with surface area configured to enhance reactions between emulsion liquid and the hydrogen peroxide; and a fourth stage, comprising:

a disinfecting chamber, including a box configured to flow clarified water in a serpentine manner, a DAF pump configured to inject hydrogen peroxide into water exiting the disinfection chamber and recirculate said water back to the box, UV lamps configured to direct energy to the water flowing through the box for breaking peroxide in said water into hydroxyl radicals.

7. The unit according to claim 6, further comprising:

another second stage immediately following said second stage and in fluid connection with said third stage to further process the effluent exiting said second stage.

8. The unit according to claim 6, wherein the ionizing lamp operates at a wavelength suitable for ionizing the supply of atmospheric gas.

9. The unit according to claim 8, wherein the ionizing lamp operates at 40-400 nm.

10. The unit according to claim 6, wherein the effluent entering the effluent chamber of the third stage is effluent that exits from the second stage, and wherein the fourth stage is configured to receive the clarified water from an output of the third stage.

* * * * *